United States Patent [19]

Barkan

[11] Patent Number: 4,736,335

[45] Date of Patent: Apr. 5, 1988

[54] MULTIPLIER-ACCUMULATOR CIRCUIT USING LATCHED SUMS AND CARRIES

[75] Inventor: Mordecai Barkan, Palo Alto, Calif.

[73] Assignee: Zoran Corporation, Santa Clara, Calif.

[21] Appl. No.: 670,222

[22] Filed: Nov. 13, 1984

[51] Int. Cl.$^4$ .............................................. G06F 7/52
[52] U.S. Cl. .................................... 364/758; 364/754; 364/748
[58] Field of Search ................ 364/758, 754, 728, 748

[56] References Cited

U.S. PATENT DOCUMENTS

| 3,794,820 | 2/1974 | Robinson | 364/758 |
| 4,354,249 | 10/1982 | King et al. | 364/754 |
| 4,432,066 | 2/1984 | Benschop | 364/758 |
| 4,511,990 | 4/1985 | Hagiwara et al. | 364/748 |
| 4,525,796 | 6/1985 | Omoda et al. | 364/200 |
| 4,589,067 | 5/1986 | Porter et al. | 364/748 |
| 4,616,330 | 10/1986 | Betz | 364/758 |

Primary Examiner—David H. Malzahn
Attorney, Agent, or Firm—Flehr, Hohbach, Test, Albritton & Herbert

[57] ABSTRACT

Vector dot multiplication is facilitated in a multiplier in which pipelining techniques are employed. Two vectors u(i), v(i), each having the same number of components (L), the components of the vector u(i) having m bits, and the components of the other vector v(i) having n bits per component. For example, a classical positive integer dot multiplier includes $m-1$ multiplier rows with each multiplier row having $n+1$ multiplying stages, each stage including an adder and latches. A latch interconnects the carry-out of each adder in a row to the carry-in of another adder in the same row, and a latch interconnects the sum output of each adder in a row to an input of another adder in another row. The result is accumulated in an adder according to the length of the vectors to be processed. 2's compliment number multiplication is accommodated by stretching each multiplier row by connecting two full adders serially therewith. Additionally, an inverter inverts the words u(i) and then applies the inverted words to the last multiplier row along with the sign bit for the other vector v(i). The same concept may be used to implement a variety of multipliers and floating point dot multipliers.

4 Claims, 6 Drawing Sheets

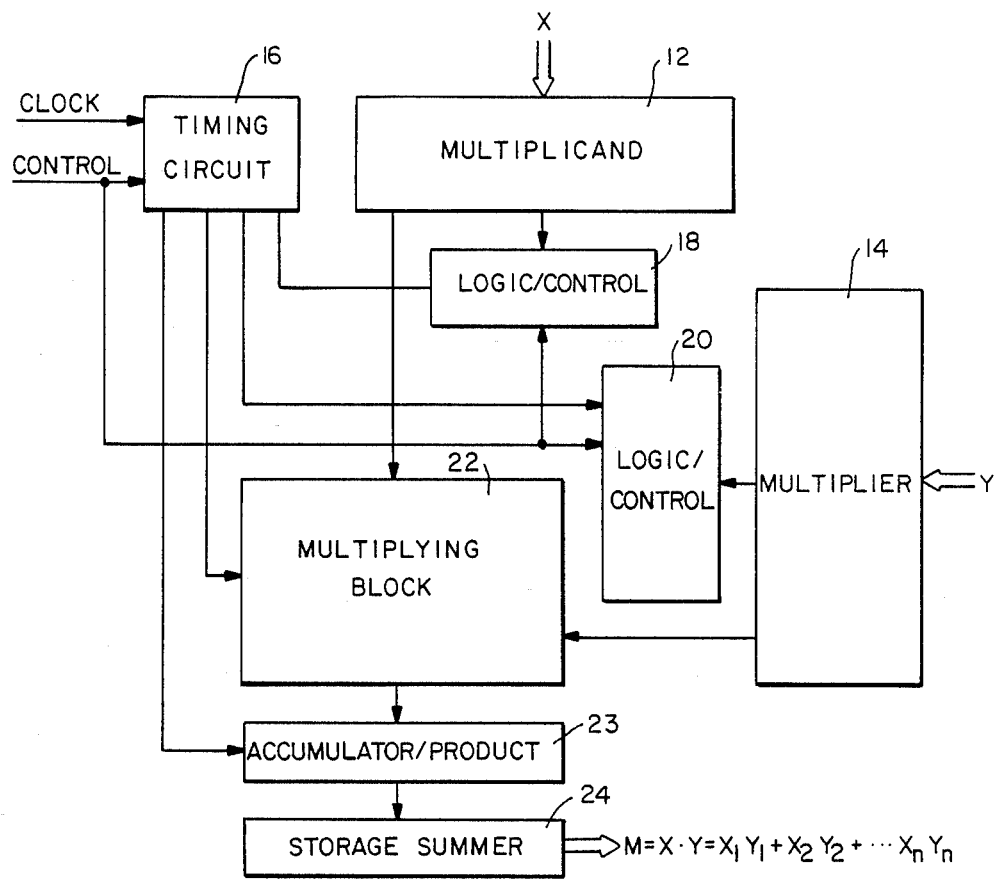
FIG.—1  PRIOR ART
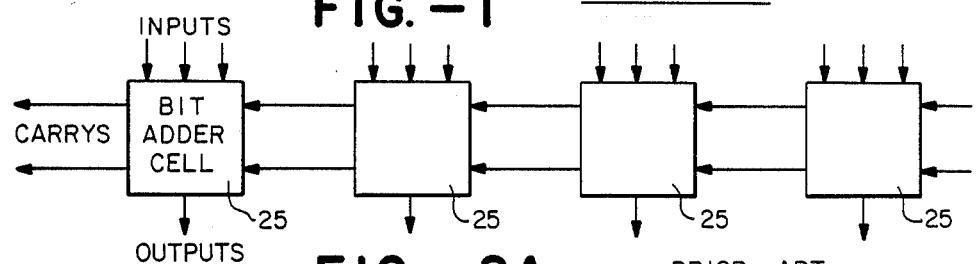
FIG.—2A  PRIOR ART
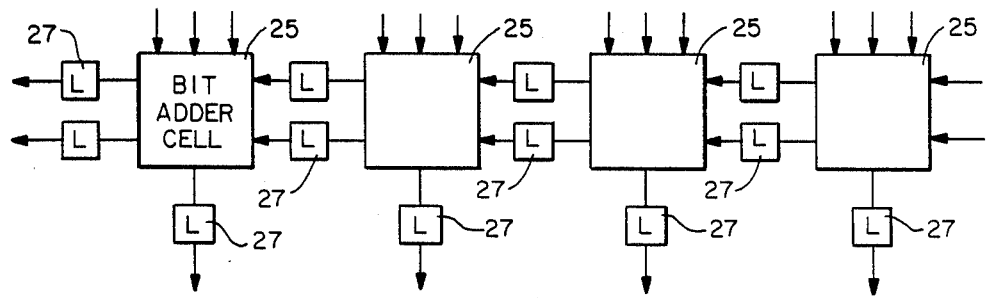
FIG.—2B

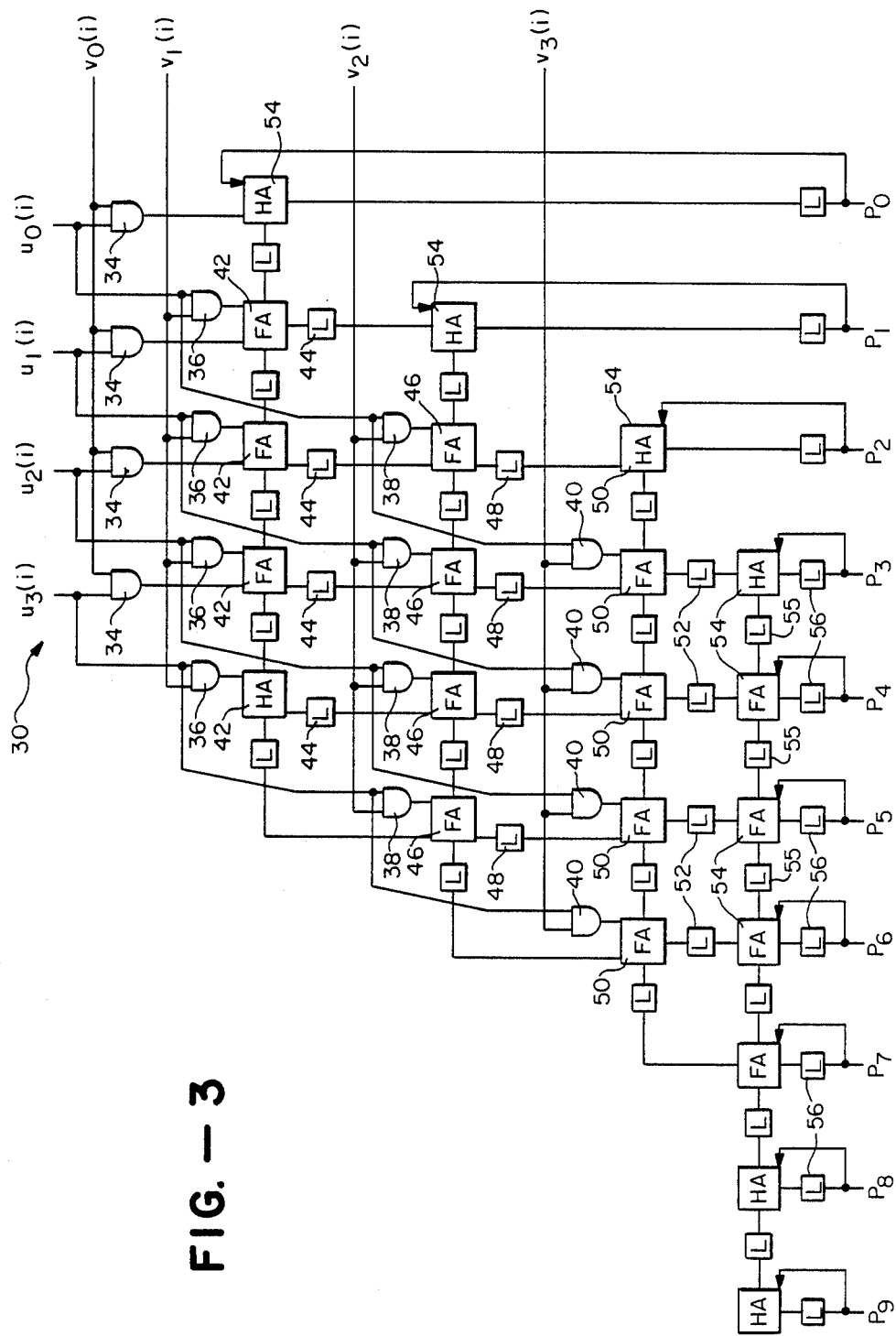
FIG. — 3

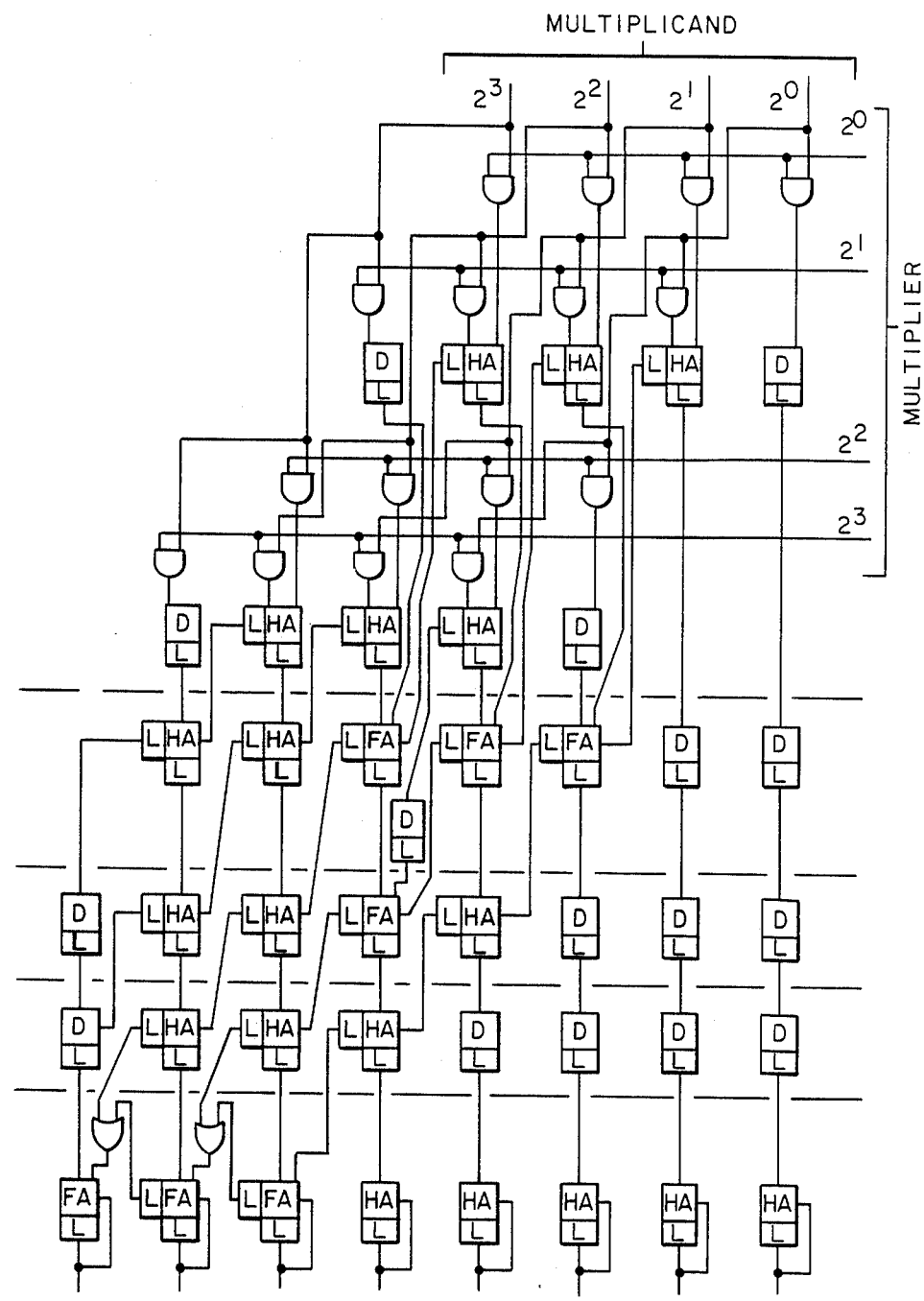
FIG.—6

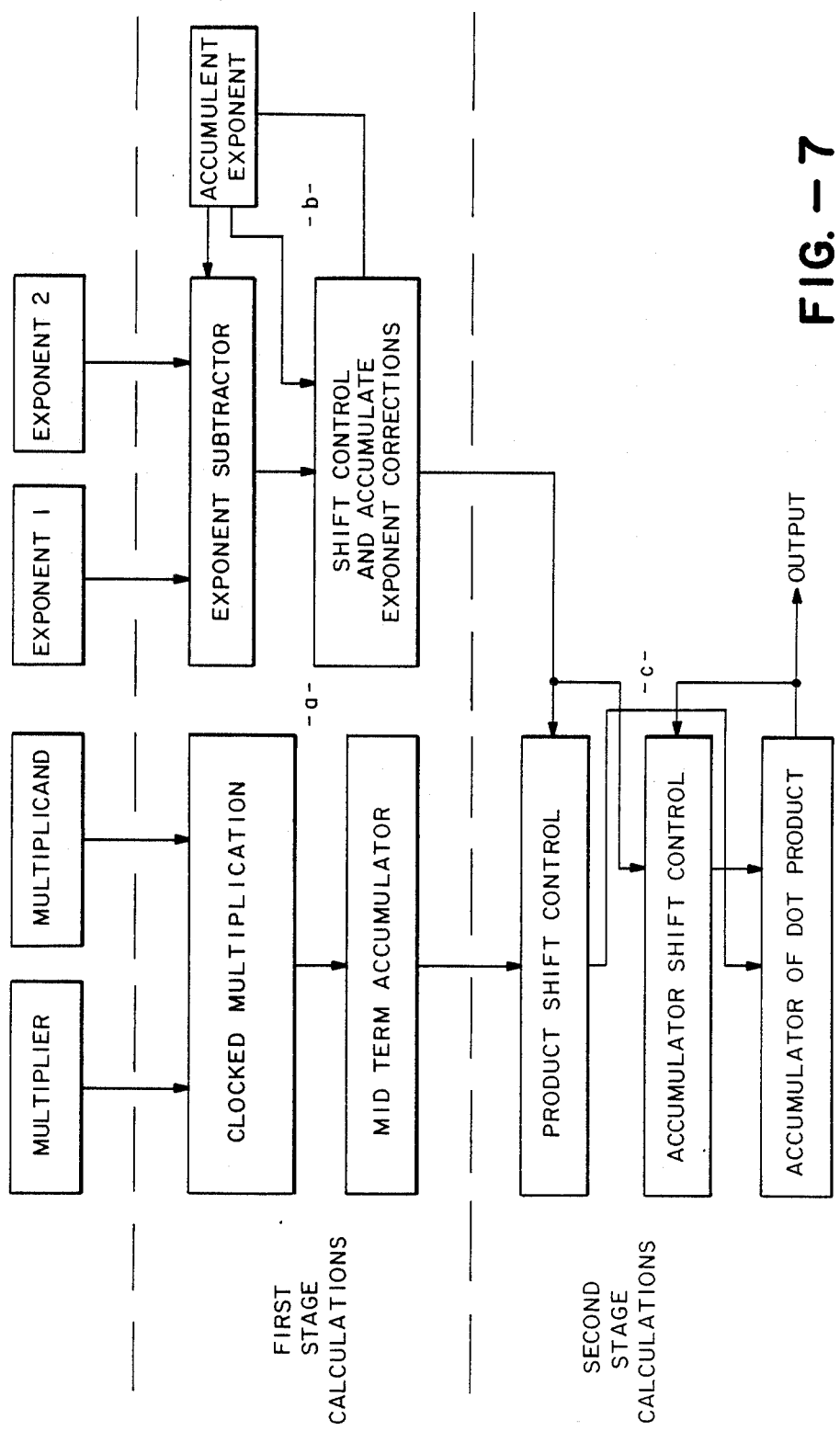

MULTIPLIER-ACCUMULATOR CIRCUIT USING LATCHED SUMS AND CARRIES

This invention relates generally to digital circuitry, and more particularly the invention relates to circuitry for expeditiously executing sealar vector multiplication also known as Scalar product or dot product of two vectors. See the definition of "scalar product" in *IEEE Standard Dictionary of Electircal and Electronic Terms*, 1984 edition. In general, scalar vector multiplication is illustrated as the sum $$\sum_{i=1}^{n} V(i) \cdot U(i)$$

of the product of the components of two vectors, with n elements each.

The scalar vector multiplication of two vectors u(i), v(i), each comprising four elements, for example, is the sum of the products of individual pairs of elements, i.e., $u_1 x v_1$ plus $u_2 x v_2$ plus $u_3 x v_3$ plus $u_4 x v_4$. Various functions in digital signal processing require vector dot multiplication. The time domain digital filter, for example, can operate on an electrical signal by expressing the filter function as a plurality of coeficients represented by the vector components or elements and expressing the signal as a plurality of elements representing sampled amplitudes as a function of time represented by the second vector elements. The filtered signal is then the Scalar or dot multiplication of the two vectors. Similarly, discrete Fourier transform, convolution, correlation, and like functions require vector dot multiplication.

Conventionally, the dot multiplication of two vectors (u(i), v(i)), is accomplished by first obtaining the individual products and then adding the individual products. The required circuitry can be large and inflexible, moreover, the time required for executing the many individual multiplications and accumulating the results places a practical limit on the utility vector dot multiplication having many component words, which is about the product of vector length with the individual multiplication duration, depending on number of bits used to describe the magnitude of vector elements.

The present invention is directed to a multiplier structure and an improved vector dot multiplier which is structurally simpler than the conventional multiplier/accumulator (scalar vector multiplier) and is more flexible as to element (word) and vector length. Importantly, the time required for vector dot multiplication is only a fraction of the time required using conventional dot multipliers. The invention has particular applicability to an array multiplier. However, the invention can be applied to any multiplier such as a canonical multiplier, Booth multiplier, and various add-shift multipliers, for example.

In accordance with a feature of the invention latches are employed for transferring partial sums and carries between adder cells thereby facilitating pipeline operation.

In accordance with another feature of the invention a pipelined structure is provided wherein all words of the multiplicand and the multiplier are processed sequentially.

In accordance with another feature of the invention the pipelined sequential multiplier is internally interconnected by adders and latches for continuous processing of the vectors.

In accordance with yet another feature of the invention 2's complement multiplication is accommodated by stretching each multiplier row to prevent overflow and by inverting the multiplicand and multiplying the inverted word (element) by the sign bit of the multiplier at the final multiplier row.

In accordance with still another feature of the invention, multiple length stages in a multiplier are accommodated by latching and shifting partial products between stages for optimum use of the multiplier length stages. The ideas may be applied also to high-speed multipliers and to floating point multipliers and multiplier-accumulators.

The invention and objects and features thereof will be more readily apparent from the following detailed description and appended claims when taken with the drawing, in which:

FIG. 1 is a functional block diagram of a conventional multiplier-accumulator.

FIGS. 2A and 2B illustrate stages of a conventional multiplier-accumulator and a modified multiplier-accumulator in accordance with the present invention.

FIG. 3 is a schematic of a multiplying-accumulating block for positive vectors in accordance with one embodiment of the present invention. (4 bit word length, 4 elements in a vector.)

FIGS. 5 and 6 are schematics for another two embodiments of fixed point multipliers in accordance with the invention.

FIG. 7 is a functional block diagram of a floating point embodiment of a schematic of a scalar vector multiplier in accordance with the invention.

Figure 4:
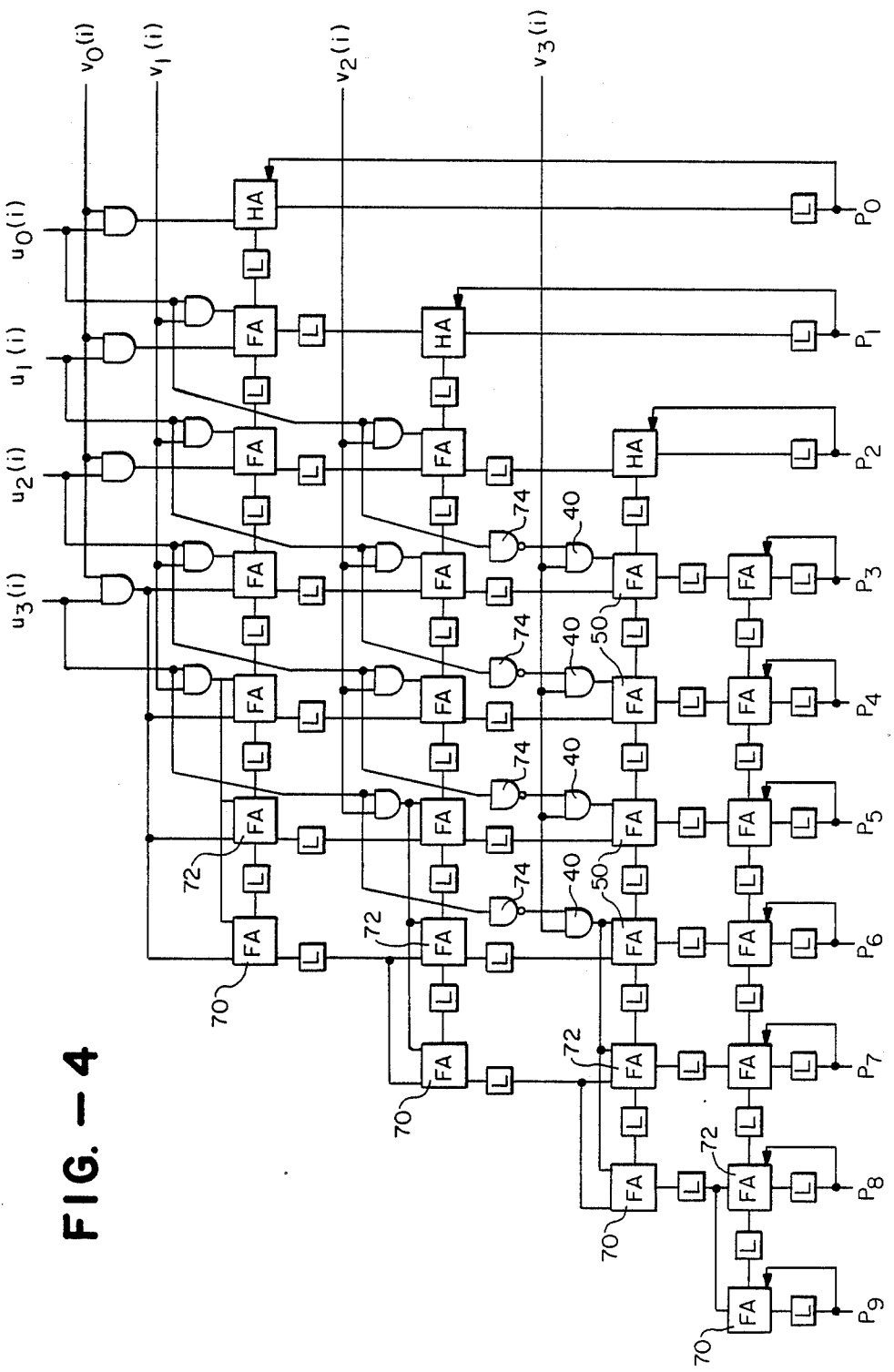
FIG. 4 is a schematic of a multiplying-accumulating block which accommodates 2's complement vectors in accordance with another embodiment of the invention.

Referring now to the drawings, FIG. 1 is a functional block diagram of a conventional multiplier accumulator [vector dot multiplier]. A first vector, X, is applied to a multiplicand register 12 and a second vector, y, is applied to a multiplier register 14. As described above, each vector comprises a plurality of components with the number of components in each vector being equal, however the number of bits in the components (or words) of each vector may be unequal. Clock and control signals are applied to a timing circuit 16 which in turn controls the logic/control 18 for the multiplicand 12 and the logic/control 20 for the multiplier 14. Digital words from the multiplicand 12 and the multiplier 14 are applied to a multiplying block 22 where the components from the multiplicand and multiplier are multiplied together in sequence. The individual products are then accumulated at 23 and summed at 24 to provide the dot product as indicated.

Consider now the vectors v and u with four bit words where (i) represents the bit location, as follows:

| | $v_3(i)$ | $v_2(i)$ | $v_1(i)$ | $v_0(i)$ | | |
|---|---|---|---|---|---|---|
| v(1) | 1 | 1 | 0 | 1 | = | 13 |
| v(2) | 1 | 0 | 1 | 1 | = | 11 |
| v(3) | 1 | 1 | 1 | 0 | = | 14 |
| v(4) | 0 | 1 | 0 | 1 | = | 5 |

| | $u_3(i)$ | $u_2(i)$ | $u_1(i)$ | $u_0(i)$ | | |
|---|---|---|---|---|---|---|
| u(1) | 1 | 1 | 1 | 1 | = | 15 |
| u(2) | 1 | 1 | 0 | 0 | = | 12 |
| u(3) | 0 | 1 | 1 | 1 | = | 7 |

| u(4) | 1 | 0 | 0 | 1 | = | 9 |

The conventional multiplying block will carry out the v(i) × u(i) multiplications as follows:

```
  1111      1100      0111      1001
  1101      1011      1110      0101
  1111      1100      1110      1001
 11110      1100       111     10010
  1111     11000       111
11000011  10000100   1100010   101101
```

The individual products would be summed to provide the vector dot product:

```
11000011 = 195
10000100 = 132
01100010 =  98
00101101 =  45
111010110 = 470
```

The time required in obtaining the vector dot product makes the conventional multiplier block the bottle neck for use with vectors having up to ten or more components.

In accordance with the present invention an improved vector scalar multiplier utilizing pipeline techniques is provided for computing the dot product in a fraction of the time required with conventional multiplier-accumulators.

FIGS. 2A and 2B illustrate stages in one embodiment of a conventional multiplier-accumulator and in a multiplier-accumulator in accordance with the invention, respectively. In FIG. 2A, each bit adder cell 25 receives a plurality of inputs from a lower order adder cell, and in response to adding the inputs to a cell, the cell provides sum output to a higher order cell and carry outputs to an adjacent cell. This is a continuous, uninterruptible procedure until the final result is obtained. Thus, a lower order process must be completed before higher order processing can begin. Accordingly, a portion of the multiplier may be unused at any one time.

In FIG. 2B the multiplier stage is modified by providing latches 27 for the carry outputs and for the sum output. Thus, the multiplication process can be interrupted with the carries and partial products transferred to a separate multiplier stage or recycled in a pipe-lined multiplier array in accordance with embodiments of the invention.

FIG. 3 is a schematic of a multiplier-accumulator according to the invention for positive vectors which employs a general multiplier modified by the techniques illustrated in FIG. 2 in accordance with one embodiment of the invention. The multiplicand vector, u(i) is applied to the input lines 30 and the multiplier vector, v(i), is applied to the input lines 32. The $v_0(i)$ bit is multiplied with each of the u(i) bits in the AND gate 34, the $v_1(i)$ bit is multiplied by each of the u(i) bits in the AND gates 36; the $v_2(i)$ bit is multiplied with each of the u(i) bits in the AND gates 38, and the $v_3(i)$ bit is multiplied by each of the u(i) in the AND gates 40. The outputs of AND gates 34, and 36 are applied as inputs to the half adders and full adders 42; and the output of the adders 42 are applied through the latches 44 as an input of the full adders 46 along with the outputs of AND gates 38. Similarly, the outputs of the adders 46 are applied through latches 48 as an input of adders 50 along with the output of AND gates 40. Note that the carry-out from each adder is applied through a latch to the carry-in of an adjacent adder in the same multiplier row, and the accumulator.

Thus, for a multiplicand, u, having n bits per word, each multiplier level requires n+1 multiplying cells (AND gate(s) and full/half adder). For a multiplier v(i), having m bits per word, m−1 rows of n+1 cells are required.

The outputs from the adders 50 in the last multiplying level are applied through latches 52 to the full adders 54 of an accumulator. The LSB half adder in each row comprises part of the accumulator 54. The outputs of the adders 54 are recirculated through latches 56 as one of the inputs to the adders 54. Again, the carry-out of the adders 54 in the accumulator are applied through latches 55 to the carry-in of an adjacent adder in the accumulator.

The final vector dot product is taken from the sum out of the adders 54 upon completion of inputting all vector components and additional clocks required to clear the multiplier section and get end result in the accumulator.

The pipelined configuration of the multiplier as shown in FIG. 3 reduces the cycle time for a complete scalar vector multiplication of long vectors to a fraction of the time required in the conventional multiplier-accumulator. For the multiplier-accumulator of FIG. 3 implemented as shown, a total of (m−1)×(n+1) adders (full or half) are required in the multiplier section and (n+1)+log$_2$ L adders are required in the accumulator section. If the time period, T, (equals gate delay (assuming full or half are equal)+adder delay+latch delay) is the basic system clock period, then the total time required for multiplication of the two vectors is:

$$T_{new} = (n + 2(m-1) + \log_2 L + L) \times T$$

The conventional multiplication method would require:

$$T_{old} = (n + 2(m-1)) \times T' \times L$$

where T'=adder delay (assuming full and half adders are equal).

If the latch and gate delays are neglected, then T'≅T and for large value of L, $T_{new} \approx (1/n + 2(m-1))T_{old}$ Thus, it is seen that the time required in completing vector dot multiplication is substantially less than the time required conventionally (assuming a straight forward architecture).

With a slight modification the multiplier-accumulator in accordance with the invention can accommodate negative or 2's complement numbers. FIG. 4 is a schematic of a 2's complement multiplier in accordance with another embodiment of the invention (4 bit two's complement, 4 element vector). The schematic is similar to the multiplier-accumulator in FIG. 3 and like elements have the same reference numeral. One modification required is the stretching of each multiplier level by adding two full adders 70 and 72 to each level of the multiplier as shown. The beginning MSB HA's of the accumulator will be changed to FA's. Additionally, the u(i) bits must be inverted by inverters 74 before application to the AND gates 40 of the last multiplier level. The other input to AND gates 40 is the sign and magnitude bit $v_3(i)$ of the multiplier. The sign bit is added to the accumulator. This implementation is basically used for the two's complement multiplier.

Assume the following values for u(i) and v(i) respectively:

| v(1) = −3 | u(1) = −1 |
|---|---|
| v(2) = −5 | u(2) = −4 |
| v(3) = −2 | u(3) = 7 |
| v(4) = 5 | u(4) = −7 |

The conventional vector dot multiplication of u and v:

| 1111 | 1100 | 0111 | 1001 |
|---|---|---|---|
| 1101 | 1011 | 1110 | 0101 |
| 1111111 | 1111100 | 01110 | |
| 111110 | 111100 | 0111 | 1111001 |
| 0001 | 01000 | 1001 | 110010 |
| 0000011 | 0010100 | 1110010 | 1011101 |

The accumulation of the products are as follows:

| 0000011 = | 3 |
|---|---|
| 0010100 = | 20 |
| 1110010 = | −14 |
| 1011101 = | −35 |
| 1100110 = | −26 |

Again, the pipelined multiplier-accumulator architecture of the FIG. 4 reduces the total scalar vector multiplication time for a 2's-compliment numbers to a fraction of the time required for individual multiplication of the vector components and then adding the individual products as noted above.

The scalar vector multiplier utilizing pipelined levels of multiplication provides greater flexibility in use as multiplier components can be serially added to expand the bit multiplication ability with vector components having increased numbers of bits. The time required in obtained a scalar vector multiplication is a fraction of the time required using conventional multiplication techniques and it is independent of wordlength of the separate vector elements.

Figure 5:
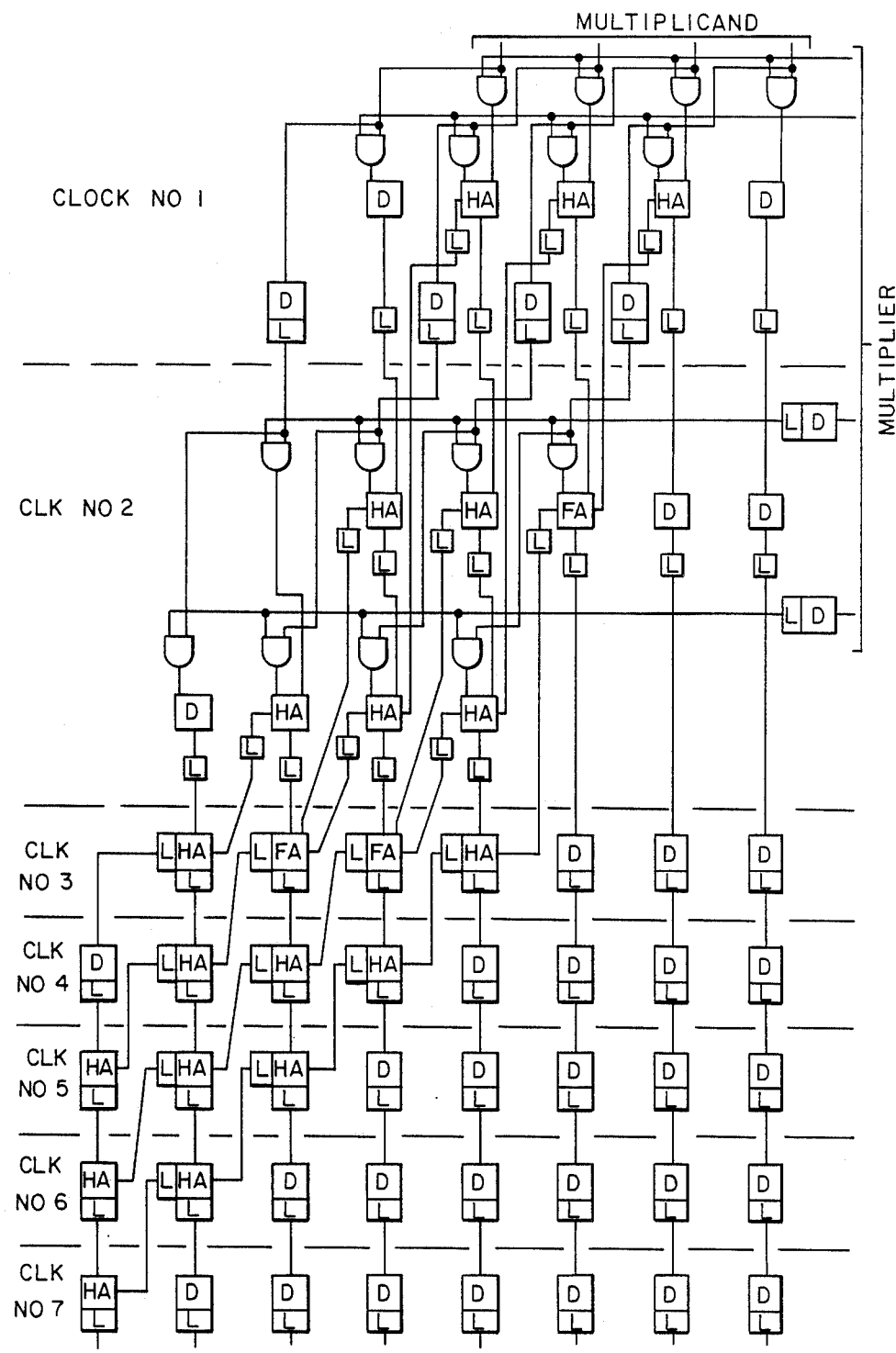

FIGS. 5 and 6 are schematics of fast multiplier circuits which illustrate other applications of the invention. In FIG. 5, a multiplier is configured for sequential multiplying four bit words and includes seven stages each operating in response to one clock signal. Thus, after the first seven cycles a product of two numbers is produced with each clock signal. The multiplier does not include accumulators as does the dot multiplier since only products of two numbers are produced. The circuit is built of four basic building blocks, namely a full adder (FA), a half adder (HA), a delay element (D), and a latch (L). The cycle time or multiplication time is limited by the delay of (FA or HA of D)+L. The design of the delay element, L, prevents the delay element from limiting the multiplication rate.

In FIG. 6, the last three stages in FIG. 5 are replaced by OR gates and recycling full adders to achieve the carries propagation in the three most significant bits. This circuit design conserves space but delays succeeding products by three clock cycles.

FIG. 7 is a functional block diagram of a floating point multiplier-accumulator which is similar to the circuit of FIG. 3 but which includes product and accumulator shift control circuitry to properly align the numbers for summing. The shift control is based on comparing the accumulator exponent, the combined multiplier and multiplicand exponents. The product is shifted whenever the combined exponents are not equal to the accumulator exponent.

While the invention has been described with reference to specific embodiments, the description is illustrative of the invention and is not to be construed as limiting the invention. Various modifications and applications may occur to those of skill in the art without departing from the true spirit and scope of the invention as defined by the appended claims.

What is claimed is:

1. A method of vector scalar multiplication of two vectors $(u_{(i)}, v_{(i)})$ by summing partial products for all pairs of vector components, each vector having the same number (L) of components, each of the components of one vector $u_{(i)}$ having a number of bits (n) and each of the components of the other vector $v_{(i)}$ having a number of bits (m), said method comprising the steps of providing m−1 rows of multiplier-accumulators, each row having n+1 multiplier-accumulator stages, said m−1 rows functioning as a dispersed accumulator of sums of partial products, applying multi-bit components of one of said vectors $u_{(i)}$ sequentially as multiplicand inputs to stages in all rows with one bit of a component going to one stage in all rows, applying multi-bit components of the other of said vectors $v_{(i)}$ as multiplier inputs to all stages in all rows with at least one bit of a component going to all stages in one row, said rows of multiplier-accumulators producing partial products of bits of pairs of components, interconnecting stages in adjacent rows by latches whereby the output of each stage of a row is transferred as an input to a stage in the next row as a partial sum of partial products, and accumulating the sum of partial products from the last multiplier-accumulator row as the product of the vector scalar multiplication.

2. A vector scalar multiplier for two vectors $(u_{(i)}, v_{(i)})$, each having the same number (L) of components, each of the components of one vector $u_{(i)}$ having a number of bits (n) and each of the components of the other vector $v_{(i)}$ having a number of bits (m), said scalar multiplier comprising a plurality of multiplier-accumulator rows (m−1) with each multiplier-accumulator row having a plurality of bit multiplying stages (n+1) with each stage including an adder having two inputs and output, a carry-in and a carry-out, said m−1 rows functioning as a dispersed accumulator of sums of partial products, latch means interconnecting the carry-out of adders in a row to the carry-in of another adder in the same row whereby each row produces a partial product, latch means interconnecting the output of each adder in a row as an input to an adder in another row for producing partial sums of partial products, means for sequentially applying multi-bit components $u_{(i)}$ of one vector as one of the inputs to adders in all rows, one bit of each component going to one stage in all rows, means for sequentially applying the bits of each multibit component $v_{(i)}$ of the other vector to adders in each row, one bit of each component going to all stages in one row, and accumulator means including a plurality of adders interconnected with adders of the last multiplier-accumulator row for accumulating the final product of said vector scalar multiplication.

3. The vector scalar multiplier as defined by claim 2 and further including means for enabling operation on 2's complement numbers, said means including an additinal two full adders serially connected by latches in each row of the multiplier-accumulator, and inverter means for inveting the words u(i) and then applying the inverted words to the last multiplier row along with the sign bit of the other vector word v(i).

4. A floating point multiplier-accumulator to compute the dot product for two vectors ($u_{(i)}$, $v_{(i)}$), each having the same number (L) of components and each component having a mantissa and an exponent, each of the components of one vector $u_{(i)}$ having a number of bits (m) and each of the components of the other vector $v_{(i)}$ having a number of bits (n), said multiplier-accumulator comprising a plurality of multiplier rows with each multiplier row having a plurality of bit multiplying stages, each stage including an adding cell having a plurality of sum inputs, a plurality of carry inputs, a plurality of carry outputs and a sum output, said plurality of multiplier rows functioning as a dispersed accumulator of sums of partial products, latch means interconnecting the carry-output of adder cells in a row to the carry input of another adder cell in the same row whereby each row produces a partial product, latch means interconnecting the sum outputs of adder cells in a row as inputs to adders in another row for producing partial sums of partial products, means for sequentially applying components $u_{(i)}$ of one vector as one of the inputs to adders in all rows, one bit of each component going to one stage in all rows, means for sequentially applying the bits of each mantissa component $v_{(i)}$ of the other vector to adders in each row, one bit of each mantissa component going to all stages in one row, product shift means for receiving a product of each multiplication and shifting the binary point thereof in response to shift control means, shift control means for comparing an exponent of an accumulated sum of products with combined exponents of a multiplier component and a multiplicand component for a product and controlling said product shift means, and accumulator means for receiving and accumulating the product of each multiplication from said product shift means.

* * * * *